Patented June 29, 1954

2,682,552

UNITED STATES PATENT OFFICE 2,682,552

HYDROCARBON SYNTHESIS PROCESS

James F. Black, Roselle, and Kenneth K. Kearby, Cranford, N. J., assignors to Standard Oil Development Company, a corporation of Delaware No Drawing. Application July 3, 1948, Serial No. 37,090

1 Claim. (Cl. 260—449.6)

The present invention refers to processes wherein iron-containing materials are employed in the form of dense turbulent beds of subdivided solids fluidized by upwardly flowing gases to resemble a boiling liquid. More particularly, the invention is concerned with iron-containing materials of improved fluidization characteristics, the preparation of such improved materials, and processes wherein such improved materials are contacted with gases in fluid high-temperature operations.

Prior to the present invention iron-containing solids have been used in various processes employing the fluid solids technique. Some of these processes involve conditions conducive to sintering and agglomeration of the finely divided iron particles, resulting in various fluidization difficulties. This condition is particularly prominent whenever fluidized iron-containing particles are heated to temperatures above about 1200° or 1300° F. in the presence of reducing gases; because of these conditions iron or iron oxides exhibit a strong tendency to sinter and agglomerate.

One outstanding example of such processes is the synthesis of hydrocarbons from carbon monoxide and hydrogen in the presence of fluidized iron-type catalysts. While the synthesis reaction itself is normally carried out at non-sintering conditions, the preparation and reactivation of the iron catalysts normally involve conditions strongly conducive to iron sintering. For example, most iron-type synthesis catalysts require a reducing sintering pretreatment in order to improve their disintegration resistance and carbon-forming tendencies in fluid operation. Carbonized or wax-bearing used iron-type synthesis catalyst is usually regenerated with reducing gases at sintering temperatures. The iron material recovered from these treatments contains a high percentage of non-fluidizable or difficultly fluidizable agglomerates and must be ground to a fluidizable particle size prior to its use in fluid-type synthesis operations.

Another process in which similar difficulties are encountered is the controlled oxidation of hydrocarbon gases or other carbonaceous materials by means of iron oxides to produce gases containing hydrogen and/or carbon monoxide in fluid operation. Fluidization troubles caused by sintering and agglomeration of the iron-containing particles at the high temperatures involved have heretofore seriously interfered with a satisfactory operation of this process on a commercial scale.

The present invention reduces these difficulties and affords various additional advantages as will be fully understood from the detailed description given below.

It is therefore the principal object of the present invention to provide improvements in processes in which finely divided iron-containing solids are contacted with gases in a fluidized state.

A more specific object of the invention is to provide means for preventing agglomeration of finely divided iron-containing solids when subjected to conditions conducive to sintering of iron or iron oxides.

Another object of the invention is to provide iron-containing solids which may be used in chemical reactions employing the fluid solids technique at conditions conducive to sintering of iron and iron oxides, without undue agglomeration of iron-containing particles of fluidizable size.

Other objects and advantages of the invention will appear hereinafter.

In accordance with the present invention iron-containing materials are used in fluid operation in the form of combinations of iron or its oxides with one or more difficultly reducible metal oxides having sintering temperatures above about 2000° F. such as $Al_2O_3$, $SiO_2$, MgO, $TiO_2$, $Cr_2O_3$, MnO, ZnO, etc. The difficultly reducible metal oxide acts as a binder or support for the iron and prevents particle agglomeration due to sintering of the iron or iron oxide present. Thus it has been found that in the presence of reducing gases composites containing, say, 80% of $Al_2O_3$ and 20% of $Fe_2O_3$ show no sign of fusion or sintering at temperatures as high as 1700° F., while magnetite and hematite lose fluidity at temperatures above 1050° F.

Naturally occurring iron compounds of the type mentioned such as high-iron bauxite, green sand, ilmenite, iron silicates, and various other similar ores are the preferred iron containing materials of the invention. Particularly, high-iron bauxite, preferably in an at least partially reduced state, has been found to be of greatest utility as a catalyst for the fluid type hydrocarbon synthesis, while ilmenite iron titanate (39% $Fe_2O_3$) offers greatest advantages for the fluid type oxidation of hydrocarbon gases to produce gas mixtures containing $H_2$ and/or CO at temperatures of about 1500°–2000° F. If desired, suitable promoters such as the oxides, carbonates or halides of alkali metals, particularly potassium and sodium may be added to the bauxite in amounts of about .5–10% based on the iron content of the material. $TiO_2$ may be partially extracted from both bauxite and ilmenite prior to use. Quite generally, the iron-containing materials of the invention should contain not substantially less than 5% by weight but may contain as much as about 80% by weight of iron calculated as $Fe_2O_3$. The preferred iron content is about 10–50% by weight on this basis.

Iron-containing materials in accordance with the present invention may be prepared by mixing finely divided iron or its oxides with one or more of the above mentioned difficultly reducible oxides preferably in the wet state followed by drying of the mixture. For example, 20–90 parts by weight of MgO or CaO may be mixed with red iron oxide, magnetite, roasted iron sulfide (iron oxide), or the like to render the latter resistant to agglomeration due to sintering of the iron oxides. The mixtures when ground to a fluidizable particle size are useful for the oxidation of gaseous hydrocarbons, to produce $H_2$ and CO in fluid operation at temperatures above about 1500° F., and, if desired, after suitable reduction in a conventional manner, as catalysts for the synthesis of hydrocarbons. Some clays such as ball clays may be used as supports or binders for the iron oxides to avoid agglomerating sintering. Clays which peptize to form colloids have the greatest covering power for iron oxide powders and are therefore most suitable. Small quantities, i. e. about 0.2% to 5% by weight of a flux material such as $B_2O_3$ or $Na_2B_4O_7$ may be added to aid in attaching the iron to the difficultly reducible metal oxide without causing agglomeration of the latter. When the material is to be used as a synthesis catalyst suitable promoters of the above mentioned type may be added to the mixture. Upon drying, the material is obtained in the form of large aggregates or lumps which may be ground to a fluidizable particle size of about 20–200 microns.

While useful iron-containing solids of improved fluidization characteristics may be obtained by combining iron or iron oxides with difficultly reducible oxides as described above best results are obtained when naturally occurring iron bearing materials of the type specified are modified to suit the intended purposes.

For example highly active and selective hydrocarbon synthesis catalysts resistant to agglomeration at iron-sintering conditions may be prepared from high-iron bauxite by impregnating the bauxite with an aqueous solution of a promoter such as potassium carbonates, drying and reducing with hydrogen. Useful bauxites include Akansas type bauxite having a composition about as follows:

| | Per cent |
|---|---|
| $Fe_2O_3$ | 7–12 |
| $TiO_2$ | 2– 3 |
| $Al_2O_3$ | 40–60 |
| Insoluble matter | 4– 8 |
| Volatile matter | 20–40 |

A catalyst so prepared may be subjected to preliminary reduction, or to regeneration with reducing or oxidizing gases, at temperatures up to 1500° F. and higher in fluid operation without forming agglomeration due to sintering.

The invention will be further illustrated by the following specific examples which demonstrate the utility of iron-containing materials for the oxidation of hydrocarbon gases and as catalysts for the synthesis of hydrocarbons from carbon monoxide and hydrogen.

*Example I*

An oxidizing agent suitable for the oxidation of hydrocarbon gases to form mixtures of carbon monoxide and hydrogen in fluid operation at temperatures of 1400°–1800° F. was obtained in the form of an ilmenite ore containing 39% $Fe_2O_3$ in combination with $TiO_2$, and with only minor or trace quantities of $SiO_2$, MgO, and MnO. This ore was used to oxidize methane to CO and $H_2$ at 1700° F. Passing 100 volumes of methane per volume of oxide per hour, a conversion of 41% was obtained with 88% selectivity to CO and 12% to $CO_2$. The tests were carried out at atmospheric pressure.

Similar ores may be useful in the conversion of solid carbonaceous material to produce CO containing gases.

*Example II*

An Arkansas bauxite with an iron content of 10.2% based on reduced catalyst and a $TiO_2$ content of 3.4% based on unreduced catalyst, was impregnated with a solution containing 13.2 grams of potassium carbonate ($K_2CO_3.1\frac{1}{2}H_2O$) in 100 cc. of water to a content of 2.2% potassium carbonate. The impregnated bauxite was dried in an oven at 250° F. and reduced at 900° F. for 6 hours, using 1000 v./v./hr. of electrolytic hydrogen. This material was tested in fixed bed operation at the conditions and with the results tabulated below.

[Temp., 600° F.; press., 250 p. s. i. g.; v./v./hr., 200.]

| | Arkansas Bauxite+ 2.2% $K_2CO_3$ | |
|---|---|---|
| Run, Hours | 116–139 | 188–259 |
| Feed, $H_2$/CO Ratio | 1.17 | 2.05 |
| Material Bal., Wt. Percent | 94 | 95 |
| CO Conv.: | | |
| Percent Input | 81 | 77 |
| Percent Output | 80 | 75 |
| cc. $C_4^+$/m.³ $H_2$+CO Fed | 112 | 81 |
| cc. $C_4^+$/m.³ $H_2$+CO Cons | 171 | 163 |
| Distr. Ratio, $C_4^+/C_1^+$ | 0.58 | 0.53 |

The above data show that the catalyst of the invention has satisfactory activity and selectivity in spite of the low iron content of only about 10%. It follows that the invention also affords a means for preparing highly useful synthesis catalysts from relatively inexpensive and abundant starting materials in an extremely simple manner.

While the above experimental data were obtained in fixed bed operation similar results may be obtained in fluid operation. It follows that the catalysts of the present invention as the result of the combination of reduced agglomerating tendency with satisfactory activity and liquid product selectivity are particularly useful for fluid operation. Synthesis catalysts suitable for fluid operation may be prepared substantially as outlined in the above example and sized to particle sizes of about 20–200 microns preferably 50–150 microns. The conditions of fluid synthesis operation are well known in the art and need not be specified here in detail for a proper understanding of the invention by those skilled in the art. Briefly, these conditions may include catalyst particle sizes of 20–200 microns, superficial linear gas velocities of about 0.1–3 ft. per second, bed densities of about 10–120 lbs. per cu. ft., $H_2$:CO ratios of about 0.5:1 to 3:1, gas recycle ratios of about 0–5, temperatures of about 550°–750° F., and pressures of about 100–650 lbs. per sq. in.

Preliminary catalyst reduction at normally sintering conditions may be carried out in fluid operation without catalyst agglomeration generally as follows. A hydrogen containing gas is passed at a rate of 500-2000 volumes per volume of catalyst per hour through a fluidized bed of the catalyst at temperatures of 900-1600° F. The reduction may be carried out at atmospheric, subatmospheric or elevated pressures. Pure hydrogen, hydrogen containing carbon monoxide, or hydrogen with diluents such as methane, nitrogen or carbon dioxide may be used as the reducing gas.

Catalyst regeneration or conditioning with reducing or oxidizing gases such as $H_2$ and/or CO, steam, $CO_2$, and oxygen, etc. in fluid operation may be carried out substantially at the fluidization conditions specified above and at temperatures of 900-1600° F. without catalyst agglomeration.

The present invention is not to be limited by any theory of the mechanism of the process or material nor to any examples given merely for illustration purposes, but only by the following claim in which it is desired to claim all novelty inherent in the invention.

What is claimed is:

In the process of synthesizing hydrocarbons from CO and $H_2$ in the presence of iron-type catalysts in the form of a dense turbulent fluidized mass of finely divided solids said process involving a treatment of said solids at conditions conducive to the sintering of iron and iron oxides, the improvement which comprises contacting said CO and $H_2$ at synthesis conditions with a catalyst consisting essentially of an at least partially reduced high iron bauxite, said catalyst being promoted by a promotional amount of an alkali metal promoter.

References Cited in the file of this patent

UNITED STATES PATENTS

| Number | Name | Date |
|---|---|---|
| 2,360,787 | Murphree et al. | Oct. 17, 1944 |
| 2,417,164 | Huber, Jr. | Mar. 11, 1947 |
| 2,433,072 | Stewart et al. | Dec. 23, 1947 |
| 2,449,071 | Hawk et al. | Sept. 14, 1948 |
| 2,455,419 | Johnson | Dec. 7, 1948 |
| 2,471,228 | Mathy | May 24, 1949 |

FOREIGN PATENTS

| Number | Country | Date |
|---|---|---|
| 337,409 | Great Britain | Oct. 24, 1930 |